United States Patent [19]
Yu

[11] Patent Number: 6,006,850
[45] Date of Patent: Dec. 28, 1999

[54] ELECTRIC-POWERED BICYCLE OPERABLE IN AN AUTOMATIC DRIVING MODE AND A BOOSTING DRIVING MODE

[75] Inventor: Tung-Shiang Yu, Taipei, Taiwan

[73] Assignee: Giant Manufacturing Co., Ltd., Taiwan

[21] Appl. No.: 08/977,699

[22] Filed: Nov. 25, 1997

[51] Int. Cl.[6] ....................................................... B62D 1/02
[52] U.S. Cl. ............................................................ 180/220
[58] Field of Search ................................. 180/65.1, 65.2, 180/65.3, 65.8, 205–207, 220–231; 318/139, 449, 452, 453, 455, 461, 465, 470

[56] References Cited

U.S. PATENT DOCUMENTS 5,777,442  7/1998  Miyata .......................................... 318/2

Primary Examiner—Christopher P. Schwartz
Assistant Examiner—C. T. Bartz
Attorney, Agent, or Firm—Harness, Dickey & Pierce, P.L.C.

[57] ABSTRACT

An electric-powered bicycle has a monitoring unit connected to a throttle detector, a bicycle torque detector and a bicycle speed detector so as to monitor the position of a twist grip throttle, the bicycle torque on a pedaling device, and the forward moving speed of the bicycle. The monitoring unit is further connected to a motor driver, and controls the motor driver to deactivate an electric driving motor when the twist grip throttle is in the non-operative position and the bicycle torque on the pedaling device is not over a preset limit while an electric power source for the electric driving motor is activated, and when the twist grip throttle is in the operative position, the bicycle torque is not over the present limit and the forward moving speed of the bicycle is not over a preset safety speed while the electric power source is activated, thereby resulting in enhanced user safety.

5 Claims, 2 Drawing Sheets

ELECTRIC-POWERED BICYCLE OPERABLE IN AN AUTOMATIC DRIVING MODE AND A BOOSTING DRIVING MODE

BACKGROUND OF THE INVENTION

1. Field of the Invention

The invention relates to an electric-powered bicycle, more particularly to an electric-powered bicycle that is operable in an automatic driving mode and a boosting driving mode.

2. Description of the Related Art

Electric-powered bicycles have been developed to permit forward movement of the bicycle without the need for applying a large amount of force during heavy load conditions. In use, when the bicycle is moving along an uphill slope, or when the rider is tired and wishes to stop pedaling the bicycle, the power source of an electric driving motor of the bicycle is activated for automatic or boosting bicycle driving movement so as to conserve the energy of the rider. The speed of the bicycle is then controlled by operating a twist grip throttle of a speed control unit of the bicycle. When the power source of the electric driving motor is deactivated, the bicycle can be moved forward in a manual driving mode only by pedaling the same. At this time, even if the twist grip throttle of the speed control unit is moved to an operative position, the electric driving motor will not generate a driving power output.

A main drawback of the conventional electric-powered bicycle resides in its insufficient safety features. Unlike a motorcycle which employs a gas engine that generates sounds or vibrations to alert the rider of the running status of the gas engine, the rider of the conventional electric-powered bicycle is unable to detect if the power source of the electric driving motor is activated unless he or she observes the state of the power switch. Thus, accidental operation of the twist grip throttle while the electric-powered bicycle is parked, such as when the rider is talking to a passer-by, with the power source of the electric driving motor in an activate state will result in forward surging movement of the bicycle, thereby resulting in danger.

SUMMARY OF THE INVENTION

The object of the present invention is to provide an electric-powered bicycle that is operable in an automatic driving mode and a boosting driving mode and that is safer to use as compared to the prior art.

Accordingly, the electric-powered bicycle of this invention comprises: a pedaling device operable in a manual driving mode so as to drive the bicycle to move forward; an electric power source; an electric driving motor operable in an automatic driving mode and in a boosting driving mode to drive the bicycle to move forward; a motor driver, interconnecting the electric power source and the electric driving motor, for controlling activation of the electric driving motor when the electric power source is activated; a speed control unit including a twist grip throttle which is operable to move between non-operative and operative positions; a throttle detector associated operably with the twist grip throttle so as to generate a throttle twist signal when the twist grip throttle is moved to the operative position; a bicycle torque detector associated operably with the pedaling device so as to generate a bicycle torque signal corresponding to bicycle torque on the pedaling device; a bicycle speed detector for generating a bicycle speed signal corresponding to forward moving speed of the bicycle; and a monitoring unit connected to the throttle detector, the bicycle torque detector and the bicycle speed detector so as to monitor the position of the twist grip throttle, the bicycle torque on the pedaling device, and the forward moving speed of the bicycle.

The monitoring unit is further connected to the motor driver, and controls the motor driver to deactivate the electric driving motor when the twist grip throttle is in the non-operative position and the bicycle torque on the pedaling device is not over a preset limit while the electric power source is activated, and when the twist grip throttle is in the operative position the bicycle torque is not over the preset limit, and the forward moving speed of the bicycle is not over a preset safety speed while the electric power source is activated.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
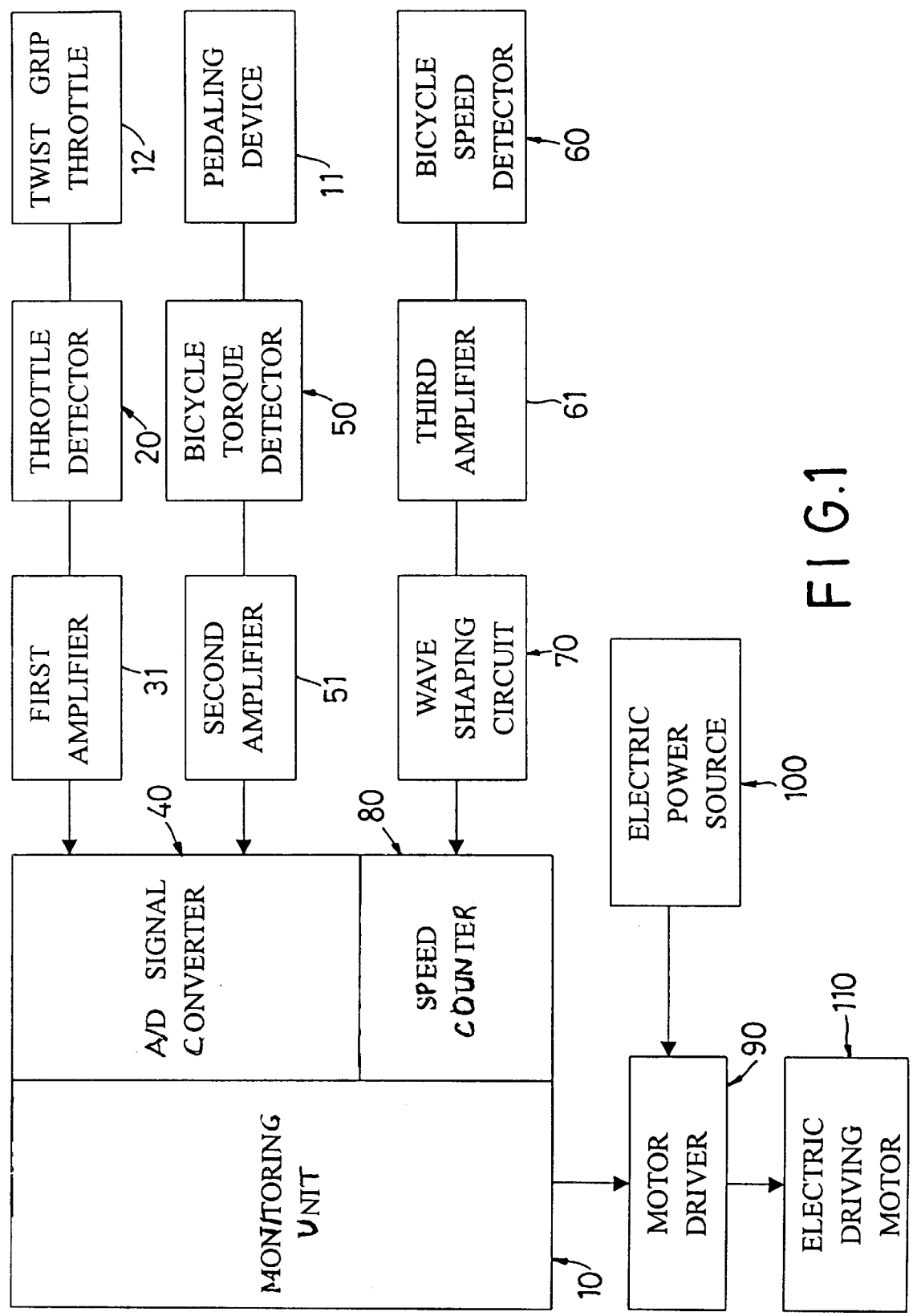
FIG. 1 is a schematic block diagram of the preferred embodiment of an electric-powered bicycle according to the present invention.

Referring to FIG. 1, the preferred embodiment of an electric-powered bicycle according to the present invention is shown to comprise a monitoring unit 10, a pedaling device 11, a speed control unit including a twist grip throttle 12, a throttle detector 20, a first amplifier 31, an analog-to-digital (A/D) signal converter 40, a bicycle torque detector 50, a second amplifier 51, a bicycle speed detector 60, a third amplifier 61, a wave shaping circuit 70, a speed counter 80, a motor driver 90, an electric power source 100, and an electric driving motor 110.

The twist grip throttle 12 is operable to move between non-operative and operative positions for controlling the speed of the bicycle, as is known in the art. The throttle detector 20 is associated operably with the twist grip throttle 12 and generates a throttle twist signal corresponding to the twisting angle of the twist grip throttle 12 when the latter is moved to the operative position. The throttle detector 20 is conventional in construction and will not be detailed herein. The first amplifier 31 is connected electrically to the throttle detector 12 and amplifies the throttle twist signal therefrom. The A/D signal converter 40 is connected to the first amplifier 31 and converts the amplified throttle twist signal into a digital throttle twist signal. The monitoring unit 10 is connected to the A/D signal converter 40 and receives the digital throttle twist signal therefrom.

The pedaling device 11 is operable to drive the bicycle to move forward in a manual driving mode, as is known in the art. The bicycle torque detector 50 is associated operably with the pedaling device 11 and generates a bicycle torque signal corresponding to the bicycle torque on the pedaling device 11. The bicycle torque is referred to herein as the resistance to pedaling movement of the pedaling device 11. Bicycle torque detectors are known in the art and are commonly employed in bicycle power meters. Measurement of the bicycle torque may be conducted by measuring the tension of a transmission chain of the pedaling device 11. Since the feature of the present invention does not reside in the construction of the known bicycle torque detector 50, a detailed description of the same will be dispensed with herein.

The second amplifier 51 is connected to the bicycle torque detector 50 and amplifies the bicycle torque signal therefrom. The A/D signal converter 40 is connected to the second amplifier 51 and converts the amplified bicycle torque signal into a digital bicycle torque signal that is received by the monitoring unit 10.

The bicycle speed detector 60 generates a bicycle speed signal corresponding to the forward moving speed of the bicycle. The third amplifier 61 is connected to the bicycle speed detector 60 and amplifies the bicycle speed signal therefrom. The wave shaping circuit 70 is connected to the third amplifier 61 and processes the amplified bicycle speed signal. The speed counter 80 is connected to the wave shaping circuit 70, and is activated by the processed output of the latter so as to generate a speed count output. The monitoring unit 10 is connected to the speed counter 80 and receives the speed count output therefrom.

The motor driver 90 interconnects the electric driving motor 110 with the monitoring unit 10 and the electric power source 100, and controls activation of the electric driving motor 110 according to the output of the monitoring unit 10 when the electric power source 100 is activated.

In use, the bicycle is operated in the manual driving mode when a power switch (not shown) of the electric power source 100, such as a battery unit, is turned off, thereby deactivating the power source 100. At this time, even if the twist grip throttle 12 is operated, the electric driving motor 110 will not generate a driving power output, and the bicycle will be driven to move forward only when the pedaling device 11 is operated. The bicycle of this embodiment is operable in the automatic driving mode and the boosting driving mode once the power switch of the electric power source 100 is turned on to activate the latter.

Figure 2:
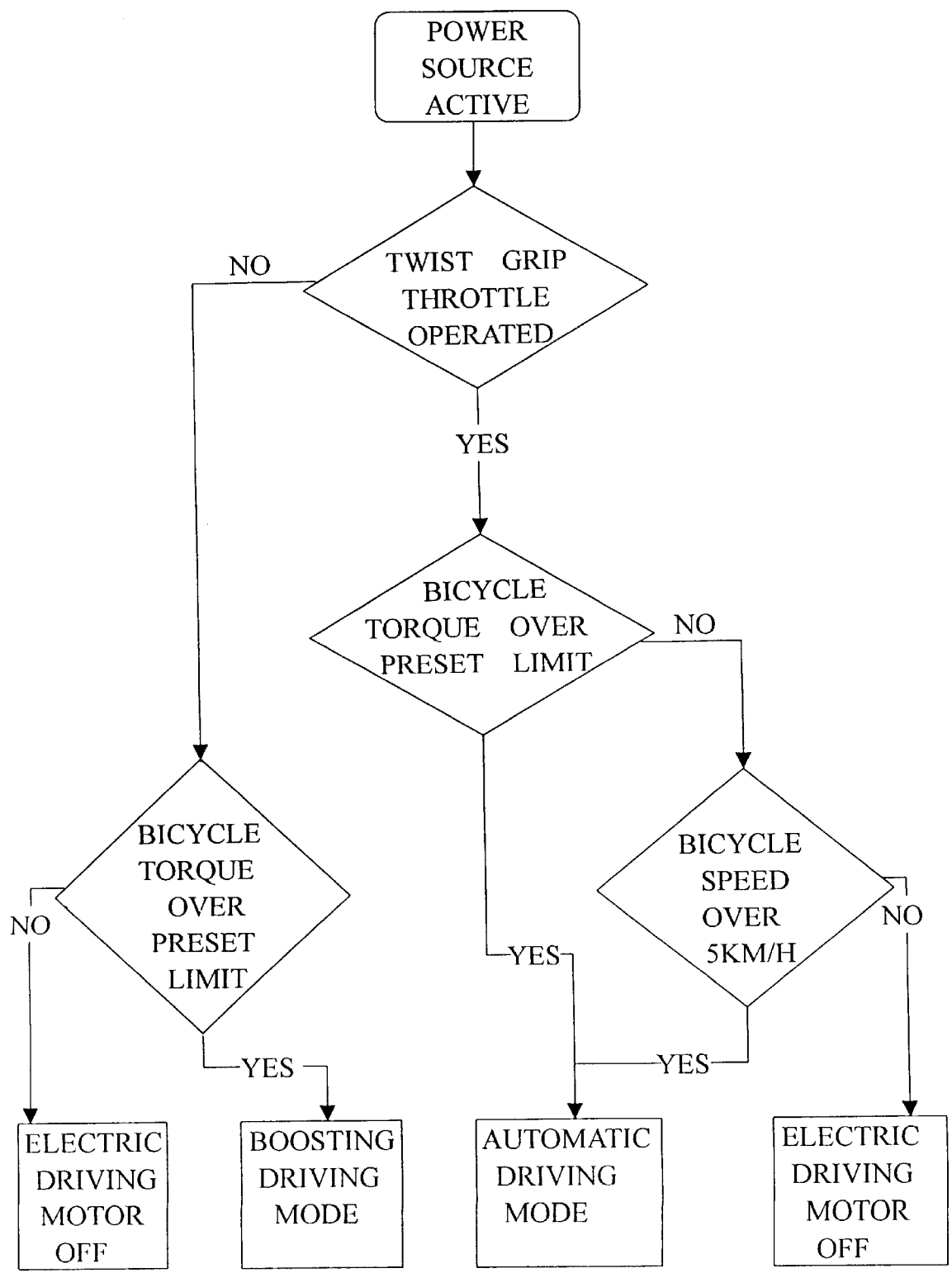
FIG. 2 is a flowchart illustrating the operation of the preferred embodiment in accordance with this invention.

Referring to FIGS. 1 and 2, when the bicycle of the preferred embodiment is used under a heavy load condition, such as when the bicycle is moving along an uphill path, and the twist grip throttle 12 is not operated, i.e. the twist grip throttle 12 is in a non-operative or stand-by position, the rider has to apply a larger amount of force when operating the pedaling device 11 for driving the bicycle to move forward in view of the larger bicycle torque that is encountered thereby. The bicycle torque on the pedaling device 11 is monitored by the monitoring unit 10 via the bicycle torque detector 50, the second amplifier 51 and the A/D signal converter 40. Upon detection that the bicycle torque is over a preset limit, the monitoring unit 10 controls the motor driver 90 to activate the electric driving motor 110 under the condition that the power source 100 is activated, thereby operating the bicycle of the preferred embodiment in the boosting driving mode. The electric driving motor 110 is deactivated when the bicycle torque is below the preset limit, such as during a light load condition, while the twist grip throttle 12 remains in the non-operative position albeit the activated state of the power source 100.

Whether or not the twist grip throttle 12 is operated by the rider can be detected by the monitoring unit 10 via the throttle detector 20, the first amplifier 31 and the A/D signal converter 40. In addition, the bicycle speed is monitored by the monitoring unit 10 via the bicycle speed detector 60, the third amplifier 61, the wave shaping circuit 70 and the speed counter 80. When the rider becomes tired and does not wish to continue pedaling of the bicycle, the monitoring unit 10 will control the motor driver 90 to activate the electric driving motor 110 and operate the bicycle of the preferred embodiment in the automatic driving mode as long as the bicycle torque is over the preset limit while the twist grip throttle 12 is in the operative position and the power source 100 is activated. If the bicycle torque is not over the preset limit while the twist grip throttle 12 is in the operative position and the power source 100 is activated, the monitoring unit 10 will still control the motor driver 90 to activate the electric driving motor 110 and operate the bicycle of the preferred embodiment in the automatic driving mode upon detection that the bicycle speed exceeds a preset safety speed, such as 5 KPH. Even if the twist grip throttle 12 is operated and the power source 100 is activated, the monitoring unit 10 will control the motor driver 90 to deactivate the electric driving motor 110 if, as shown in FIG. 2, the bicycle torque is not over the preset limit and the bicycle speed drops below the preset safety speed, such as when parking the bicycle.

It has thus been shown that, when the power source 100 is activated, activation of the electric driving motor 110 of the bicycle of the preferred embodiment is permitted only in the event of a heavy load condition, regardless of whether the twist grip throttle 12 is in the operative or non-operative position, or when the bicycle speed is above a preset safety speed while the twist grip throttle 12 is in the operative position. Thus, accidental operation of the twist grip throttle 12 while the bicycle is parked, such as when the rider is talking to a passer-by, with the power source 100 in an activate state will not result in activation of the electric driving motor 110 and in a forward surging motion of the bicycle, thereby resulting in enhanced user safety.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electric-powered bicycle, comprising:
   a pedaling device operable in a manual driving mode so as to drive the bicycle to move forward;
   an electric power source;
   an electric driving motor operable in an automatic driving mode and in a boosting driving mode to drive the bicycle to move forward;
   a motor driver, interconnecting said electric power source and said electric driving motor, for controlling activation of said electric driving motor when said electric power source is activated;
   a speed control unit including a twist grip throttle which is operable to move between non-operative and operative positions;
   a throttle detector associated operably with said twist grip throttle so as to generate a throttle twist signal when said twist grip throttle is moved to the operative position;
   a bicycle torque detector associated operably with said pedaling device so as to generate a bicycle torque signal corresponding to bicycle torque on said pedaling device;
   a bicycle speed detector for generating a bicycle speed signal corresponding to forward moving speed of the bicycle; and
   a monitoring unit connected to said throttle detector, said bicycle torque detector and said bicycle speed detector so as to monitor the position of said twist grip throttle, the bicycle torque on said pedaling device, and the forward moving speed of the bicycle, said monitoring unit being further connected to said motor driver;

said monitoring unit controlling said motor driver to deactivate said electric driving motor when said twist grip throttle is in the non-operative position and the bicycle torque on said pedaling device is not over a preset limit while said electric power source is activated, and when said twist grip throttle is in the operative position, the bicycle torque on said pedaling device is not over the preset limit, and the forward moving speed of the bicycle is not over a preset safety speed while said electric power source is activated.

2. The electric-powered bicycle as claimed in claim 1, wherein said monitoring unit further controls said motor driver to activate said electric driving motor in the boosting driving mode when said twist grip throttle is in the non-operative position and the bicycle torque on said pedaling device is over the preset limit while said electric power source is activated, and to activate said electric driving motor in the automatic driving mode under at least the condition that said twist grip throttle is in the operative position, the bicycle torque on said pedaling device is not over the preset limit, and the forward moving speed of the bicycle is over the preset safety speed while said electric power source is activated.

3. The electric-powered bicycle as claimed in claim 1, further comprising an amplifier connected to said throttle detector, and an analog-to-digital converter which interconnects said amplifier and said monitoring unit.

4. The electric-powered bicycle as claimed in claim 1, further comprising an amplifier connected to said bicycle torque detector, and an analog-to-digital converter which interconnects said amplifier and said monitoring unit.

5. The electric-powered bicycle as claimed in claim 1, further comprising an amplifier connected to said bicycle speed detector, a wave shaping circuit connected to said amplifier, and a speed counter which interconnects said wave shaping circuit and said monitoring unit.

* * * * *